United States Patent
Ericsson et al.

(10) Patent No.: US 11,073,810 B2
(45) Date of Patent: Jul. 27, 2021

(54) PRESENTATION OF GRAPHICAL VISUALIZATIONS AND CONTROL MECHANISMS IN-LINE WITH PROGRAMMING LOGIC

(71) Applicant: ROCKWELL AUTOMATION TECHNOLOGIES, INC., Mayfield Heights, OH (US)

(72) Inventors: Matthew R. Ericsson, Lyndhurst, OH (US); Christopher E. Stanek, Hudson, OH (US); Douglas J. Reichard, Fairview Park, OH (US); Benjamin Henderson, Milwaukee, WI (US); Christopher W. Como, Chagrin Falls, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 14/996,198

(22) Filed: Jan. 14, 2016

(65) Prior Publication Data

US 2017/0205792 A1    Jul. 20, 2017

(51) Int. Cl.
G05B 19/042    (2006.01)

(52) U.S. Cl.
CPC ............ *G05B 19/0426* (2013.01); *G05B 2219/23067* (2013.01); *G05B 2219/25268* (2013.01)

(58) Field of Classification Search
CPC .......... G05B 19/0426; G05B 2219/25268
See application file for complete search history.

(56) References Cited

U.S. PATENT DOCUMENTS

| | | | | |
|---|---|---|---|---|
| 5,940,293 A | * | 8/1999 | Schwenke | G05B 19/056 700/61 |
| 6,076,020 A | * | 6/2000 | Schwenke | G05B 19/056 700/104 |
| 6,108,662 A | * | 8/2000 | Hoskins | G06Q 10/06 700/95 |
| 6,154,684 A | * | 11/2000 | Schwenke | G05B 19/056 700/159 |
| 6,157,864 A | * | 12/2000 | Schwenke | C08F 290/06 700/17 |
| 6,161,051 A | * | 12/2000 | Hafemann | G05B 19/41885 700/17 |
| 6,167,406 A | * | 12/2000 | Hoskins | G06F 17/30289 705/1.1 |
| 6,268,853 B1 | * | 7/2001 | Hoskins | G05B 15/02 700/83 |

(Continued)

*Primary Examiner* — Charles R Kasenge

(57) ABSTRACT

Techniques to facilitate programming industrial control systems to operate machinery in an industrial automation environment are disclosed herein. In at least one implementation, a user interface is displayed for a control program editor comprising programming logic associated with at least one machine system. Operational data associated with operating the at least one machine system controlled by an industrial controller executing the programming logic is received. The programming logic and the operational data are processed to determine contextual associations between the programming logic and the operational data. In the user interface for the control program editor, the operational data is displayed in context with the programming logic associated therewith based on the contextual associations.

20 Claims, 7 Drawing Sheets

(56) References Cited

U.S. PATENT DOCUMENTS

| | | | | |
|---|---|---|---|---|
| 6,553,268 B1* | 4/2003 | Schwenke | G05B 19/056 | 700/12 |
| 6,556,950 B1* | 4/2003 | Schwenke | G05B 17/02 | 700/83 |
| 6,618,856 B2* | 9/2003 | Coburn | G05B 19/41885 | 700/86 |
| 6,862,553 B2* | 3/2005 | Schwenke | G05B 17/02 | 463/24 |
| 6,993,456 B2* | 1/2006 | Brooks | G05B 19/409 | 434/224 |
| 7,143,366 B1* | 11/2006 | McKelvey | G05B 19/056 | 715/234 |
| 7,266,476 B2* | 9/2007 | Coburn | G05B 17/02 | 700/83 |
| 7,546,232 B2* | 6/2009 | Brooks | G05B 19/409 | 700/83 |
| 7,831,411 B2* | 11/2010 | Reichard | G05B 19/042 | 700/108 |
| 2002/0120921 A1* | 8/2002 | Coburn | G05B 19/41885 | 717/140 |
| 2002/0173860 A1* | 11/2002 | Bruce | G05B 19/042 | 700/17 |
| 2003/0182083 A1* | 9/2003 | Schwenke | G05B 17/02 | 702/183 |
| 2004/0073404 A1* | 4/2004 | Brooks | G05B 19/409 | 702/183 |
| 2004/0128120 A1* | 7/2004 | Coburn | G05B 17/02 | 703/26 |
| 2004/0181293 A1* | 9/2004 | Tanizawa | B29C 45/76 | 700/17 |
| 2005/0278670 A1* | 12/2005 | Brooks | G05B 19/409 | 703/6 |
| 2006/0074514 A1* | 4/2006 | Mukai | G05B 19/4069 | 700/177 |
| 2006/0100797 A1* | 5/2006 | Poorman | G01H 1/00 | 702/56 |
| 2006/0224250 A1* | 10/2006 | Callaghan | G05B 19/054 | 700/1 |
| 2007/0146491 A1* | 6/2007 | Tremblay | G06K 9/6253 | 348/211.99 |
| 2007/0174225 A1* | 7/2007 | Blevins | G06F 9/4488 | 340/3.9 |
| 2008/0065243 A1* | 3/2008 | Fallman | G05B 19/409 | 700/83 |
| 2010/0256785 A1* | 10/2010 | Lloyd | G05B 19/056 | 700/83 |
| 2012/0331352 A1* | 12/2012 | Guenther | G05B 19/0426 | 714/38.1 |
| 2014/0108985 A1* | 4/2014 | Scott | G05B 15/02 | 715/771 |

* cited by examiner

PRESENTATION OF GRAPHICAL VISUALIZATIONS AND CONTROL MECHANISMS IN-LINE WITH PROGRAMMING LOGIC

TECHNICAL FIELD

Aspects of the disclosure are related to computing hardware and software technology, and in particular to industrial automation applications.

TECHNICAL BACKGROUND

Industrial automation environments typically utilize various machines during the industrial manufacturing process, such as drives, pumps, motors, and robots. These machines typically have various moving parts and other components that continually produce operational data over time related to the performance of the machine, such as the machine's pressure, temperature, speed, and other metrics. Industrial environments also commonly include a Human-Machine Interface (HMI). An HMI typically receives and processes the status data from the machines to generate various graphical displays, which may indicate the current and historical performance of the machines. For example, an HMI graphical display might indicate status metrics of a drive, the pressure of a pump, the speed of a motor, or the output of a robot. In traditional implementations, the HMI may also provide a mechanism for an operator to send control instructions to a control system that controls the machines. For example, an operator might use the HMI to direct the control system to update drive parameters, turn on a pump, speed-up a motor, or stop a robot.

Overview

Provided herein are systems, methods, and software to facilitate programming industrial control systems to operate machinery in an industrial automation environment. In at least one implementation, a user interface is displayed for a control program editor comprising programming logic associated with at least one machine system. Operational data associated with operating the at least one machine system controlled by an industrial controller executing the programming logic is received. The programming logic and the operational data are processed to determine contextual associations between the programming logic and the operational data. In the user interface for the control program editor, the operational data is displayed in context with the programming logic associated therewith based on the contextual associations.

This Overview is provided to introduce a selection of concepts in a simplified form that are further described below in the Detailed Description. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Implementations disclosed herein provide for displaying visualizations of data and machine control instructions related to various machine operations in-line with their associated programming logic within a control program editor. For example, along with the programming logic intended for execution by industrial control systems, a logic programming environment could display key performance indicators (KPIs) related to operational data associated with machines in an industrial automation environment, such as parameters, pressures, temperatures, speeds, production rates, or some other status metrics. In some examples, the operational data for some KPIs may comprise dynamic charts or trends, real-time video, or some other graphical content. In addition, by presenting push buttons, switches, and other visualizations of machine controls, the system could enable interaction with and operation of industrial controllers directly from within the logic editor. The ability to visualize data and control machine operation within the context of programming logic provides users an enhanced understanding and greater insight into how the logic is executing when controlling industrial equipment.

Figure 1:
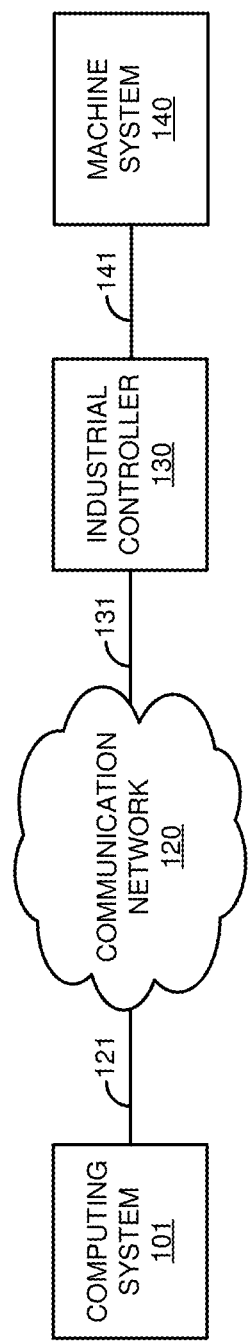
FIG. 1 is a block diagram that illustrates a communication system in an exemplary implementation.
Figure 2:
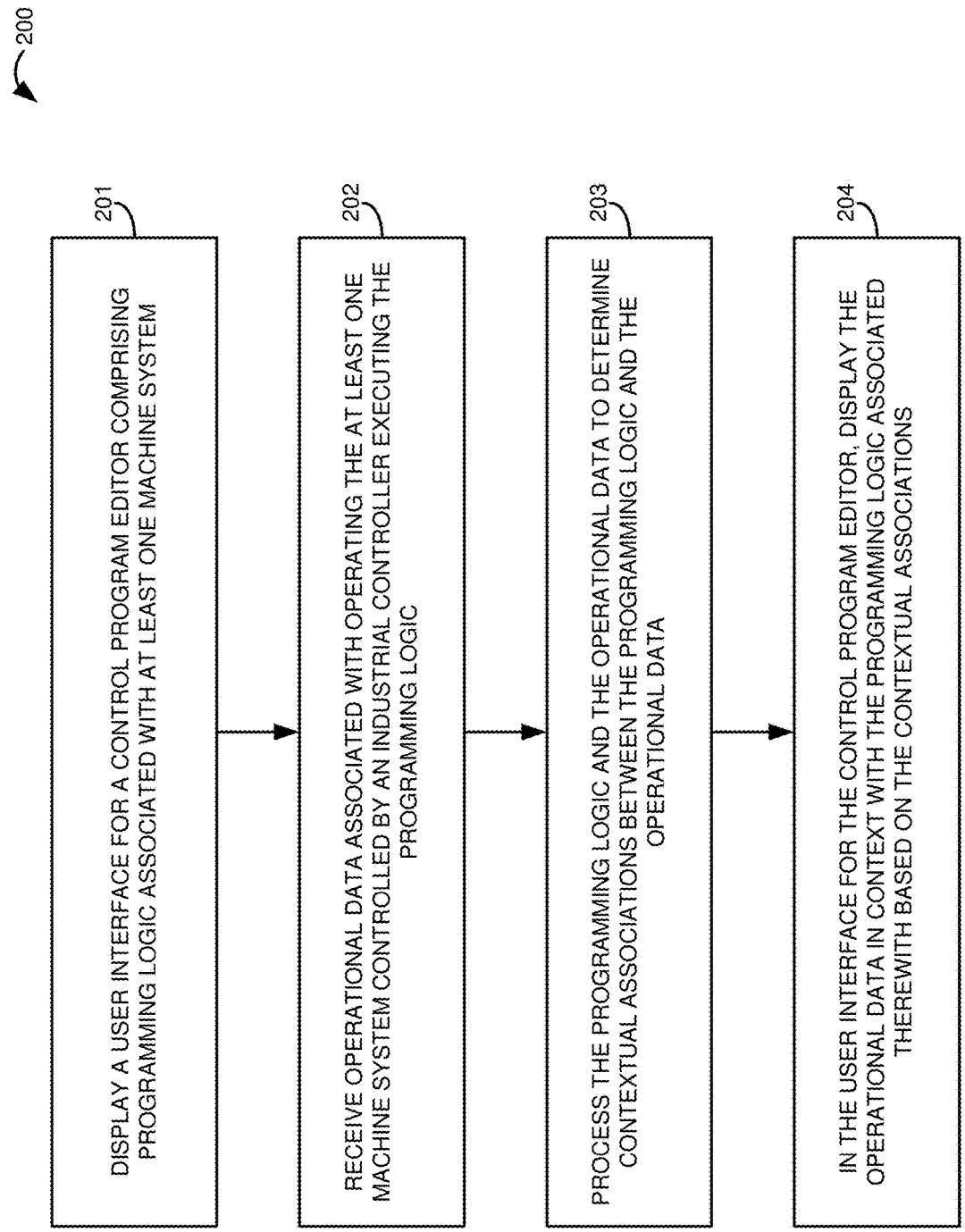
FIG. 2 is a flow diagram that illustrates an operation of a computing system in an exemplary implementation.
Figure 3:
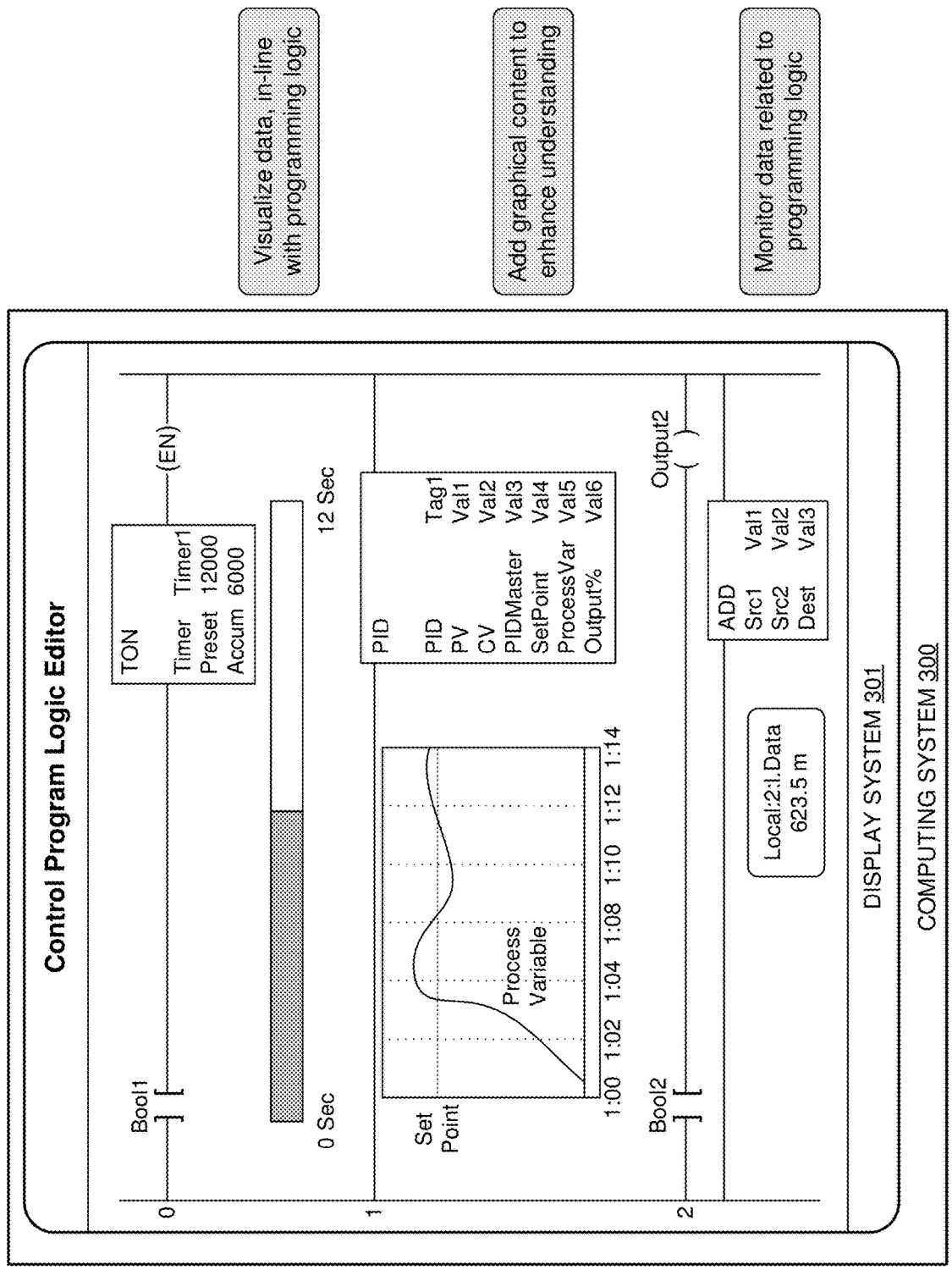
FIG. 3 is a block diagram that illustrates an operational scenario of a computing system in an exemplary implementation.
Figure 4:
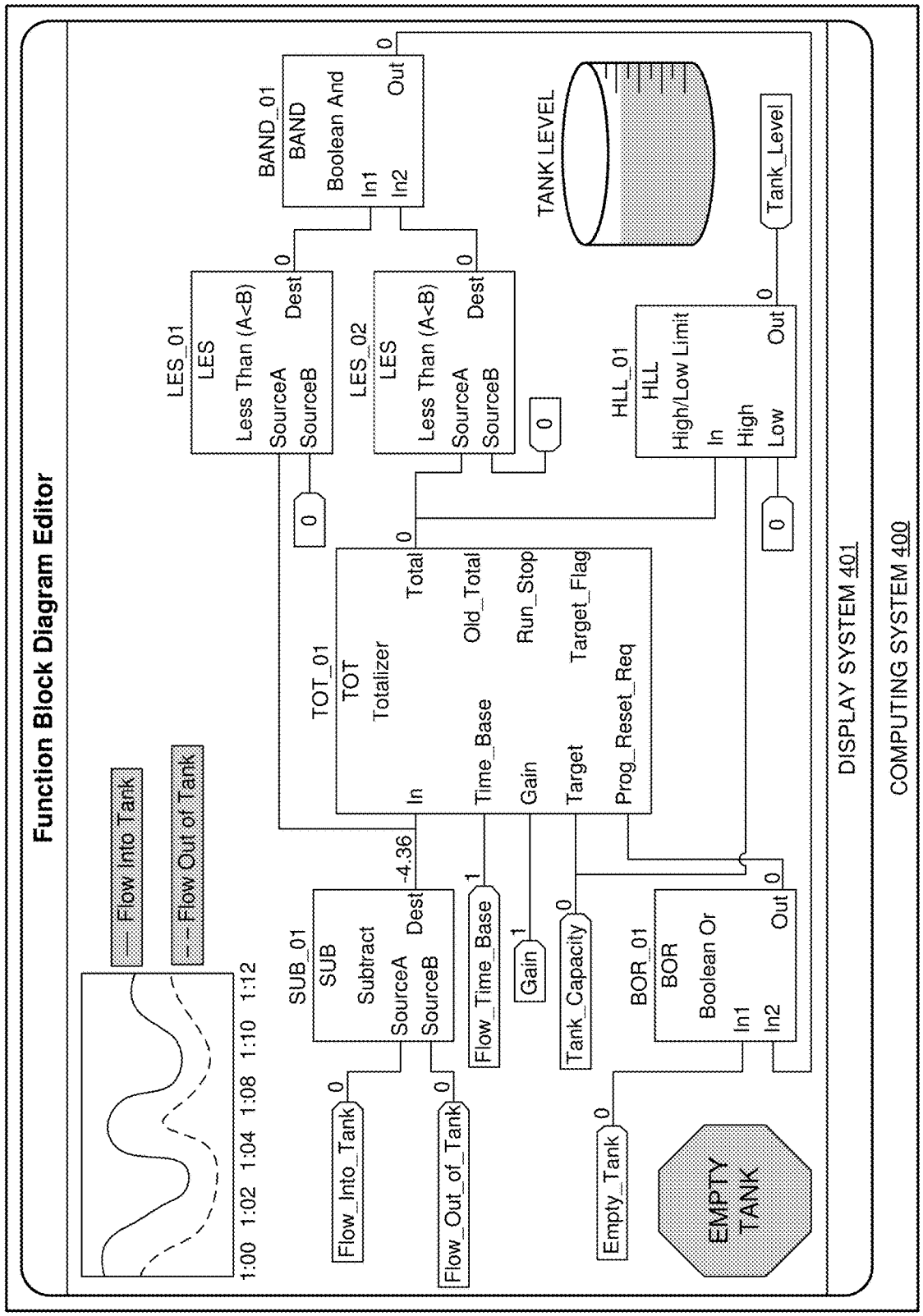
FIG. 4 is a block diagram that illustrates an operational scenario of a computing system in an exemplary implementation.
Figure 5:
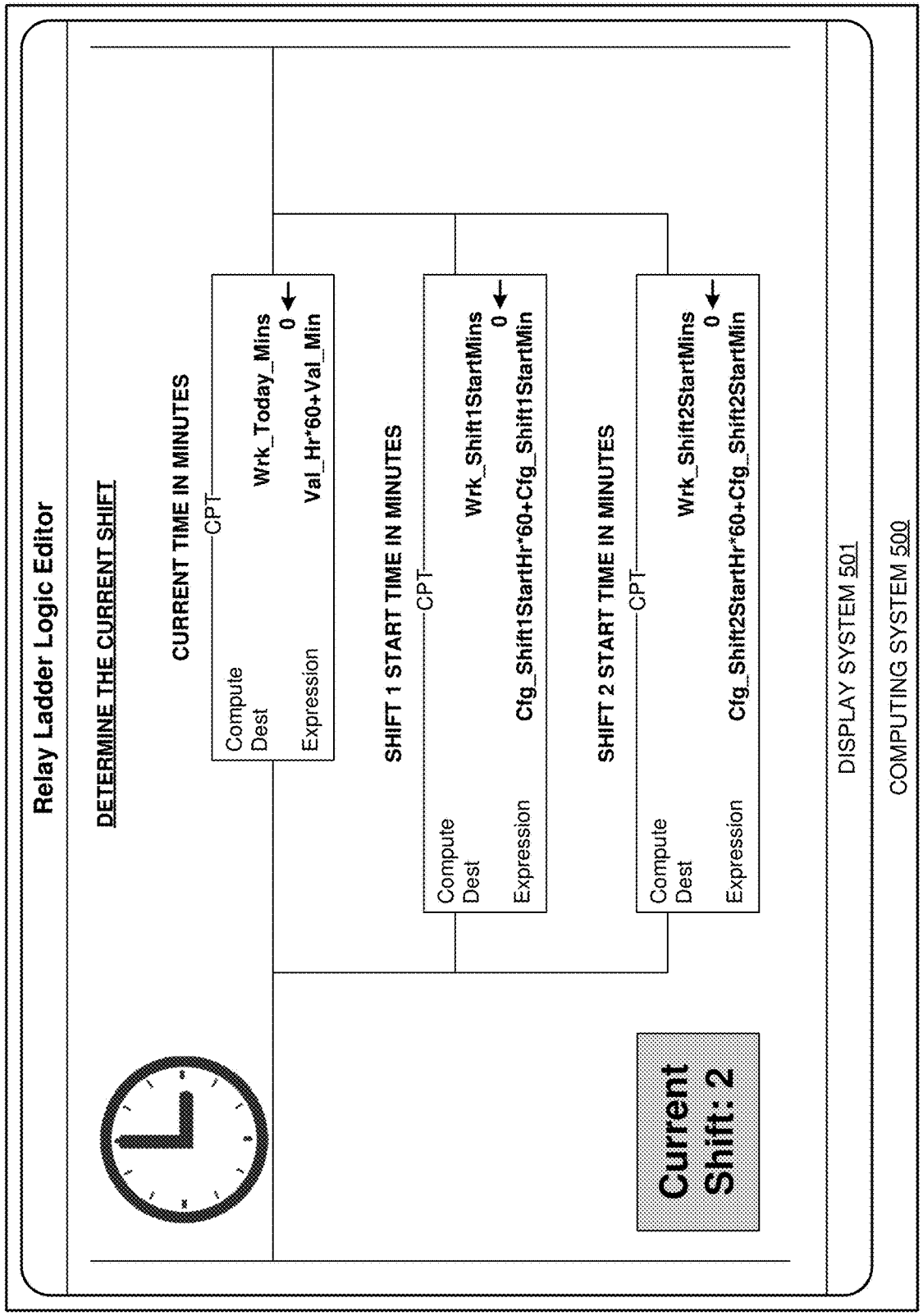
FIG. 5 is a block diagram that illustrates an operational scenario of a computing system in an exemplary implementation.
Figure 6:
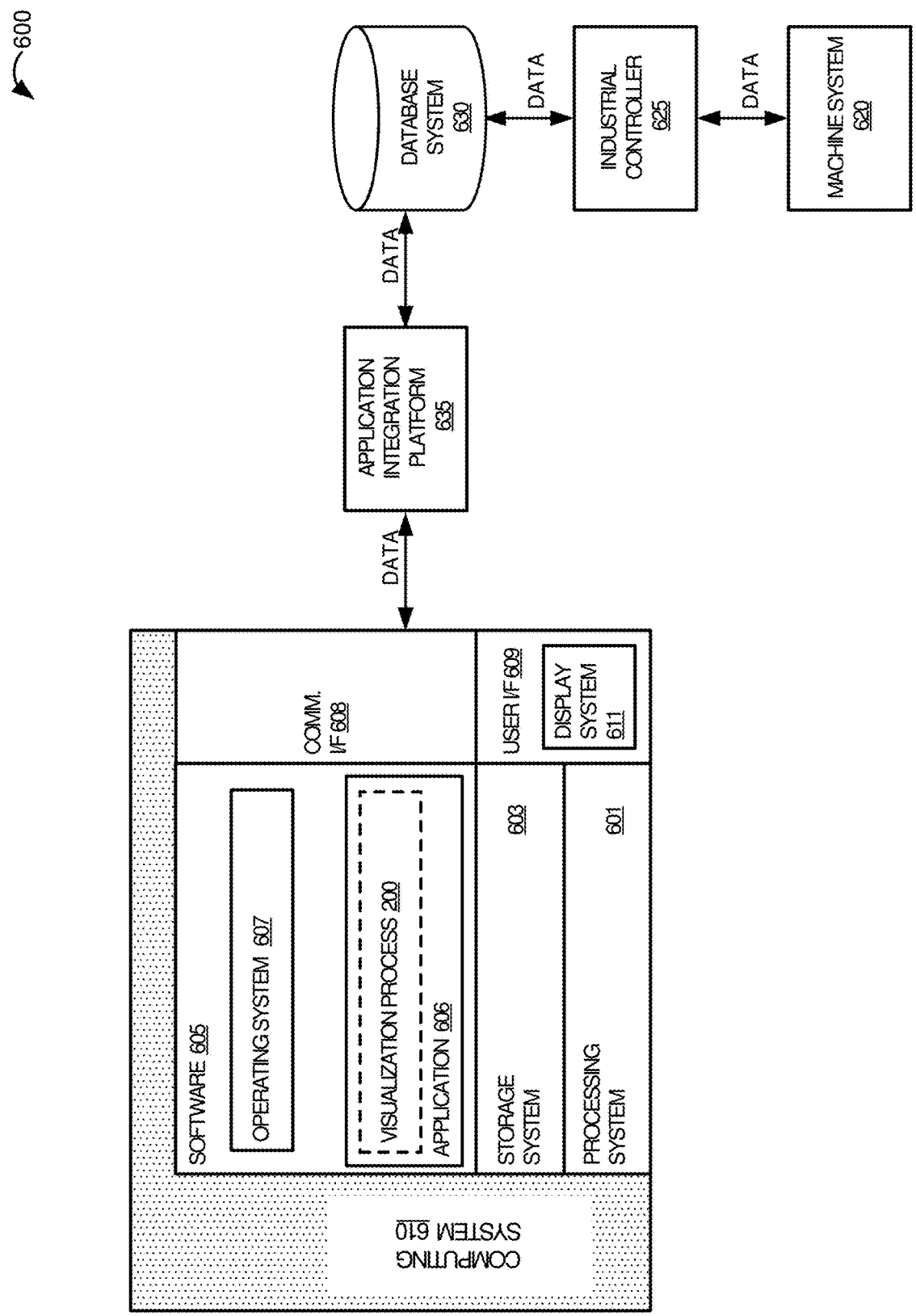
FIG. 6 is a block diagram that illustrates an operational scenario involving a computing system in an industrial automation environment in an exemplary implementation.
Figure 7:
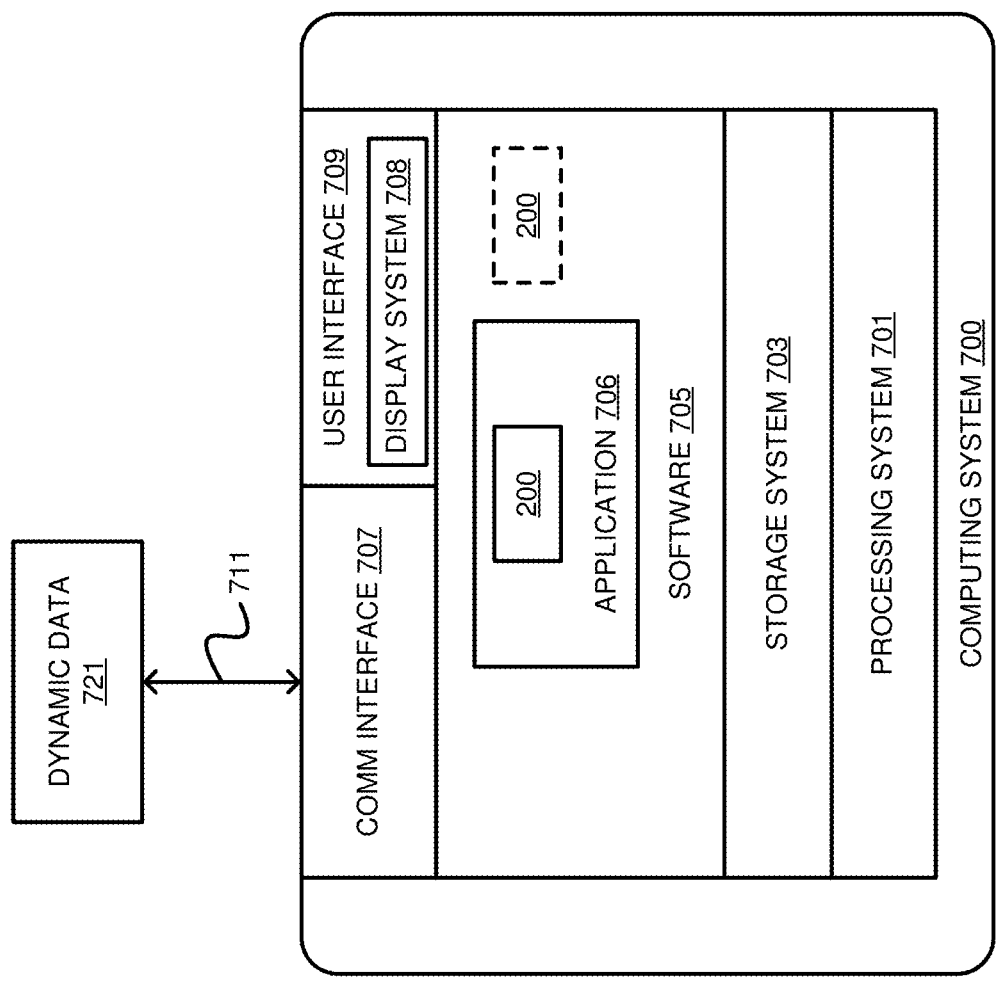
FIG. 7 is a block diagram that illustrates a computing system in an exemplary implementation.

Referring now to the drawings, FIG. 1 illustrates a communication system that may be employed to facilitate programming industrial control systems to operate machinery in an industrial automation environment. FIG. 2 illustrates a visualization process that may be performed by a computing system. FIG. 3 illustrates an operational scenario involving a control program logic editor having data visualizations in-line with the programming logic in an exemplary implementation. FIG. 4 illustrates an operational scenario involving a function block diagram editor with values, visualizations, and interaction controls directly in context with their associated programming logic in an exemplary implementation. FIG. 5 illustrates an operational scenario involving a relay ladder logic editor augmented with graphics in an exemplary implementation. FIG. 6 illustrates an exemplary industrial automation environment that includes a computing system that may be used to execute a visualization process, and FIG. 7 illustrates an exemplary computing system that may be used to perform any of the visualization processes and operational scenarios described herein.

Turning now to FIG. 1, communication system 100 is illustrated in an exemplary implementation. Communication system 100 includes computing system 101, communication network 120, industrial controller 130, and machine system 140. Computing system 101 and communication network 120 communicate over communication link 121, while communication network 120 and industrial controller 130 are in communication over communication link 131. Industrial controller 130 and machine system 140 communicate over communication link 141. In some examples, communication network 120 could comprise an on-premise private network or private cloud accessible over a local network connection, a public cloud-based environment accessible over a wide area network such as the Internet, or any other deployment scheme, including combinations thereof.

In operation, computing system 101 executes a control program editor which provides a user interface for viewing and editing program instructions that industrial controller 130 can execute to control the operation of machine system 140. Computing system 101 may receive content such as key performance indicators and other data items associated with the operation of machine system 140 under the control of industrial controller 130 for integration and display along with the programming logic within the control program editor. The control program editor may also display graphical representations of input mechanisms that the user may select to control various operations of machine system 140 via industrial controller 130. In this manner, the programming logic displayed in the control program editor may be enhanced with rich, in-line data visualizations and interactions, enabling clear understanding of the logic operation and the ability to execute the programming logic to observe the real-time effects of its operation. An exemplary operation of computing system 101 will now be described in greater detail with respect to FIG. 2.

FIG. 2 is a flow diagram that illustrates an operation 200 of a computing system in an exemplary implementation. The operation 200 shown in FIG. 2 may also be referred to as visualization process 200 herein. The steps of the operation are indicated below parenthetically. The following discussion of operation 200 will proceed with reference to computing system 101 of FIG. 1 in order to illustrate its operations, but note that the details provided in FIG. 1 are merely exemplary and not intended to limit the scope of process 200 to the specific implementation shown in FIG. 1.

Operation 200 may be employed to operate a computing system to facilitate programming industrial control systems to operate machinery in an industrial automation environment. As shown in the operational flow of process 200, computing system 101 displays a user interface for a control program editor comprising programming logic associated with at least one machine system 140 (201). A user typically interacts with the user interface of the control program editor to design and edit the programming logic, which is then executed by industrial controller 130 to control the operation of machine system 140. The programming logic could comprise both textual and graphical formats. In some examples, the programming logic could comprise relay ladder logic, sequential function charts, function block diagrams, structure text, or any other type of logic programming language, including combinations thereof.

Computing system 101 receives operational data associated with operating the at least one machine system 140 controlled by industrial controller 130 executing the programming logic (202). In some implementations, the operational data could be received from industrial controller 130, machine system 140, an application server, database system, human-machine interface (HMI), or any other data source in an industrial automation environment, including combinations thereof. The operational data could comprise any data associated with the operation of industrial controller 130 and machine system 140, including various control instructions for operating machine system 140 via industrial controller 130. In some examples, the operational data could comprise operational status metrics, machine data, images, screen graphics data, screen captures, video data, sound recordings, production processes, tag data, visualizations, alarms, notifications, drive configurations, dashboards, HMI display screens, key performance indicators, charts, trends, and other graphical content, simulation data, version numbers, catalogs, spare parts inventories, maintenance/repair schedules, links to documentation, electrical drawings, manuals, material safety data sheets, various operating procedures, incident reports including problems and solutions, chat transcripts, and any other data associated with the operation of machine system 140. The operational data could also include a number of machine stops in a day or during a work shift, summary of overall equipment effectiveness (OEE), summary of key performance indicators, number of users connected to machine system 140 in a work shift or some other period, modifications to a configuration of machine system 140, customized reports, and any other statistics or related data associated with the operation of industrial controller 130 and machine system 140. Further, in at least one implementation, the operational data could comprise at least one interaction control which upon selection directs industrial controller 130 to execute at least a portion of the programming logic to control an operation of machine system 140. In some examples, the interaction controls included in the operational data could comprise graphical visualizations of push buttons, switches, levers, valves, or any other type of control mechanism. In some implementations, computing system 101 could be configured to receive a selection of at least one interaction control and responsively display new operational data resulting from industrial controller 130 executing at least the portion of the programming logic to control the operation of machine system 140.

Computing system 101 processes the programming logic and the operational data to determine contextual associations between the programming logic and the operational data (203). The contextual associations typically describe aspects of the operational data that are related to the execution of the programming logic by industrial controller 130 and the resulting operations of machine system 140. In at least one implementation, to determine the contextual associations between the programming logic and the operational data, computing system 101 may analyze the programming logic to identify which portions of the operational data are generated when corresponding portions of the programming logic are executed. In some implementations, computing system 101 could process the programming logic and the operational data to determine the contextual associations by processing instructions that define relationships between the operational data and the programming logic. These instructions could be predetermined, provided by a user of computing system 101, or received from some other source in some examples. The instructions could describe particular data types, values, visualizations, controls, and other aspects of the operational data that are associated with different portions of the programming logic.

In the user interface for the control program editor, computing system 101 displays the operational data in context with the programming logic associated therewith based on the contextual associations (204). To display the operational data in context with the programming logic, computing system 101 may process the contextual associations to determine where to display the operational data in the user interface for the control program editor. Typically, computing system 101 displays the relevant operational data items proximate to the programming logic that affects them. For example, for programming logic that drives the operation of a motor, computing system 101 could display a toggle switch to start and stop the motor, the motor's speed in revolutions per minute, operating temperature, and other status metrics alongside the associated programming logic that performs these functions. Computing system 101 may also receive the operational data as it is generated by machine system 140 operating in real-time, and could update the values and visualizations of the operational data dynamically in some implementations.

Advantageously, computing system 101 displays operational data in context with its associated programming logic within a control program editor. The operation of machine system 140 is also facilitated by inserting common interaction controls in-line with their underlying logic. In this manner, computing system 101 enriches the display of programming logic with relevant graphical data visualizations and machine control mechanisms, thereby assisting operations engineers, maintenance personnel, and other users to monitor and troubleshoot the execution of industrial controller 130 and machine system 140. An example of operational data and graphical content displayed within a logic editor that illustrates one possible implementation of the techniques disclosed herein will now be discussed with respect to FIG. 3.

FIG. 3 is a block diagram that illustrates an operational scenario involving computing system 300 in an exemplary implementation. In this example, computing system 300 comprises display system 301, which presents an exemplary user interface for a control program logic editor. The editor displays programming logic enhanced with data visualizations, graphical content, and relevant data values.

The top rung of the ladder logic, labeled "0", has a Boolean input value of "Bool1" and an output value labeled "EN". The data set shown for this rung includes values for "Timer", "Preset", and "Accum". Just below the top rung, a visualization of the data is presented in-line with the programming logic, illustrating the data from zero to twelve seconds. This visualization supplements the data set by providing the user with a quick graphical reference of the data for this portion of the programming logic.

The next rung of the ladder logic, labeled "1", includes a data set for a process that may be performed by a machine in an industrial automation environment. The data set for the process includes the data values "PID", "PV", "CV", "PID-Master", "SetPoint", "ProcessVar", and "Output %". To the left of this data, a graphical representation of the "Process Variable" is displayed over time in a trend diagram. The "Set Point" data value is also marked on this graph, enabling the user to easily view when the "Process Variable" is above or below the "Set Point" value. This graphical content helps to enhance the user's understanding of the process as it executes, which can be updated dynamically with new data as it is generated over time.

In the bottom rung of the ladder logic, labeled "2", another Boolean input value is shown, labeled "Bool2", along with an output value labeled "Output2". This portion of the ladder logic includes data values for an addition function labeled "ADD" with input values of "Src1" and "Src2" and an output value labeled "Dest". Data related to this programming logic is displayed to the left of the data values for the addition function, enabling the user to monitor this data in real-time as the programming logic is executed.

In some implementations, the user is able to customize the display of the visual enhancements to the programming logic. For example, the user could specify which visualizations, graphical content, and relevant data values should be displayed among the programming logic, along with various display properties. In some examples, the display properties could include a type of indicator for a particular data value, such as a gauge, meter, trend, chart, indicator light, color, icon, graphic, value box, table, report, or any other indicator type. The display properties could also specify other information related to the display of the data, such as a value source, description, caption, minimum and maximum values, data range, data units, data format, degree of accuracy, display location, size, orientation, and any other configurable display properties of the data values. An example of a function block diagram editor augmented with data visualization graphics that illustrates another possible implementation of the techniques disclosed herein will now be discussed with respect to FIG. 4.

FIG. 4 is a block diagram that illustrates an operational scenario involving computing system 400 in an exemplary implementation. Computing system 400 comprises display system 401, which presents an exemplary user interface for a function block diagram editor. In this example, the editor displays functional programming logic for a supply tank in a production process. Beneficially, the function block diagram shown on display system 401 has been enhanced with graphical content, a control mechanism, and a visualization of the tank level.

As illustrated in FIG. 4, the function block diagram includes programming logic for controlling and monitoring the operation of the supply tank. Included in the function block diagram are function blocks that perform the operations of "Subtract", "Boolean Or", "Less Than", "Boolean And", and determine a "High/Low Limit". The function block diagram also includes a main "Totalizer" function having several inputs and outputs.

The "Subtract" function block takes as input the "Flow_Into_Tank" and "Flow_Out_of_Tank" values and computes the difference to determine the incremental net flow into or out of the tank. Proximate to these input values, a graphical representation of the flow rates is depicted within the function block diagram editor. This flow rate trend graphic assists the user during execution of the programming logic by enabling the user to easily view in real-time the different flow rates the logic is processing.

In the bottom-left corner of the function block diagram editor, a pushbutton switch labeled "EMPTY TANK" is displayed. When selected by the user, the switch causes the "Empty_Tank" value input into the "Boolean Or" function block to transition to true, causing the tank to immediately empty. By displaying the pushbutton next to the "Empty_Tank" Boolean value it affects, the user is afforded a greater ability to test and execute the programming logic.

Finally, a visualization of the tank level appears in the bottom-right corner of the function block diagram editor. The "Tank Level" graphic provides the user with a view of the level of liquid in the tank in real-time as the programming logic is executed. The "Tank Level" graphic provides a visualization of the "Tank_Level" output from the "High/Low Limit" function block, enabling the user to quickly view the state of the tank level during program execution, thereby enhancing the user's understanding of the operation of the programming logic. An example of a relay ladder logic editor augmented with data visualization graphics that illustrates another possible implementation of the techniques disclosed herein will now be discussed with respect to FIG. 5.

FIG. 5 is a block diagram that illustrates an operational scenario involving computing system 500 in an exemplary implementation. Computing system 500 comprises display system 501, which presents an exemplary user interface for a relay ladder logic editor. In this example, the editor displays ladder logic that determines the current shift based on the current time and the shift start times, enhanced with graphical content and computational output to provide greater utility to the user.

As shown in FIG. 5, the programming logic includes computational blocks that determine the current time in minutes, the shift 1 start time in minutes, and the shift 2 start time in minutes. The graphical representation of the clock appearing in the top-right corner of display system 501 provides the user with a quick visual reference of the current time. Similarly, a visualization indicating the current shift appears in the lower-left corner of display system 501. When the ladder logic is executed, the system processes the current time to compute the current shift, and this information is output and displayed graphically within the relay ladder logic editor. In this example, the programming logic is executed and determines that shift 2 is the current shift, and the result of these computations is visualized in the "Current Shift" value box graphic. Advantageously, by displaying the computational output of the current shift graphically within the relay ladder logic editor, the user is able to quickly test and verify the proper operation of the programming logic without having to refer to a separate HMI display or other external applications.

Referring back to FIG. 1, computing system 101 comprises a processing system and communication transceiver. Computing system 101 may also include other components such as a user interface, data storage system, and power supply. Computing system 101 may reside in a single device or may be distributed across multiple devices. Examples of computing system 101 include mobile computing devices, such as cell phones, tablet computers, laptop computers, notebook computers, and gaming devices, as well as any other type of mobile computing devices and any combination or variation thereof. Examples of computing system 101 also include desktop computers, server computers, and virtual machines, as well as any other type of computing system, variation, or combination thereof. In some implementations, computing system 101 could comprise a mobile device capable of operating in a server-like fashion which, among other uses, could be utilized in a wireless mesh network.

Communication network 120 could comprise multiple network elements such as routers, gateways, telecommunication switches, servers, processing systems, or other communication equipment and systems for providing communication and data services. In some examples, communication network 120 could comprise wireless communication nodes, telephony switches, Internet routers, network gateways, computer systems, communication links, or some other type of communication equipment, including combinations thereof. Communication network 120 may also comprise optical networks, asynchronous transfer mode (ATM) networks, packet networks, wireless mesh networks (WMN), local area networks (LAN), metropolitan area networks (MAN), wide area networks (WAN), or other network topologies, equipment, or systems—including combinations thereof. Communication network 120 may be configured to communicate over metallic, wireless, or optical links. Communication network 120 may be configured to use time-division multiplexing (TDM), Internet Protocol (IP), Ethernet, optical networking, wireless protocols, communication signaling, peer-to-peer networking over Bluetooth, Bluetooth low energy, Wi-Fi Direct, near field communication (NFC), or some other communication format, including combinations thereof. In some examples, communication network 120 includes further access nodes and associated equipment for providing communication services to several computer systems across a large geographic region.

Industrial controller 130 typically comprises a processing system and communication transceiver. Industrial controller 130 may reside in a single device or may be distributed across multiple devices. Industrial controller 130 may be a discrete system or may be integrated within other systems, including other systems within communication system 100 or an automation control system. In some examples, industrial controller 130 could comprise automation controllers, programmable logic controllers (PLCs), programmable automation controllers (PACs), or any other controllers used in automation control. In some implementations, a PLC, PAC, and/or specific modules within a PLC rack could provide some or all of the functionality described herein for industrial controller 130.

Machine system 140 could comprise any machinery or equipment used in industrial automation. In some examples, machine system 140 could comprise a sensor, drive, pump, filter, drill, motor, robot, fabrication machinery, mill, printer, or any other industrial automation equipment. Additionally, machine system 140 could comprise other industrial equipment, such as a brew kettle in a brewery, a reserve of coal or other resources, or any other element that may reside in an industrial automation environment. Although shown separately in FIG. 1, in at least one implementation machine system 140 could comprise industrial controller 130 or portions thereof.

Communication links 121, 131, and 141 use metal, air, space, optical fiber such as glass or plastic, or some other material as the transport medium—including combinations thereof. Communication links 121, 131, and 141 could use various communication protocols, such as TDM, IP, Ethernet, telephony, optical networking, hybrid fiber coax (HFC), communication signaling, wireless protocols, or some other communication format, including combinations thereof. Communication links 121, 131, and 141 could be direct links or may include intermediate networks, systems, or devices.

Turning now to FIG. 6, a block diagram that illustrates an industrial automation environment 600 in an exemplary implementation is shown. Industrial automation environment 600 provides an example of an industrial automation environment that may be utilized to implement the visualization processes disclosed herein, but other environments could also be used. Industrial automation environment 600 includes computing system 610, machine system 620, industrial controller 625, database system 630, and application integration platform 635. Machine system 620 and controller 625 are in communication over a communication link, controller 625 and database system 630 communicate over a communication link, database system 630 and application integration platform 635 communicate over a communication link, and application integration platform 635 and computing system 610 are in communication over a communication link. Note that there would typically be many more machine systems in most industrial automation environments, but the number of machine systems shown in FIG. 6 has been restricted for clarity.

Industrial automation environment 600 comprises an automobile manufacturing factory, food processing plant, oil drilling operation, microprocessor fabrication facility, or some other type of industrial enterprise. Machine system 620 could comprise a sensor, drive, pump, filter, drill, motor, robot, fabrication machinery, mill, printer, or any other industrial automation equipment, including their associated control systems. A control system comprises, for example, industrial controller 625, which could include automation controllers, programmable logic controllers (PLCs), programmable automation controllers (PACs), or any other controllers used in automation control. Additionally, machine system 620 could comprise other industrial equipment, such as a brew kettle in a brewery, a reserve of coal or other resources, or any other element that may reside in an industrial automation environment 600.

Machine system 620 continually produces operational data over time. The operational data indicates the current status of machine system 620, such as parameters, pressure, temperature, speed, energy usage, operational equipment effectiveness (OEE), mean time between failure (MTBF), mean time to repair (MTTR), voltage, throughput volumes, times, tank levels, or any other performance status metrics. The operational data may comprise dynamic charts or trends, real-time video, or some other graphical content. Machine system 620 and/or controller 625 is capable of transferring the operational data over a communication link to database system 630, application integration platform 635, and computing system 610, typically via a communication network. Database system 630 could comprise a disk, tape, integrated circuit, server, or some other memory device. Database system 630 may reside in a single device or may be distributed among multiple memory devices.

Application integration platform 635 comprises a processing system and a communication transceiver. Application integration platform 635 may also include other components such as a router, server, data storage system, and power supply. Application integration platform 635 provides an example of application server 130, although server 130 could use alternative configurations. Application integration platform 635 may reside in a single device or may be distributed across multiple devices. Application integration platform 635 may be a discrete system or may be integrated within other systems—including other systems within industrial automation environment 600. In some examples, application integration platform 635 could comprise a FactoryTalk® VantagePoint server system provided by Rockwell Automation, Inc.

The communication links over which data is exchanged between machine system 620, industrial controller 625, database system 630, application integration platform 635, and communication interface 608 of computing system 610 could use metal, air, space, optical fiber such as glass or plastic, or some other material as the transport medium—including combinations thereof. The communication links could comprise multiple network elements such as routers, gateways, telecommunication switches, servers, processing systems, or other communication equipment and systems for providing communication and data services. These communication links could use various communication protocols, such as TDM, IP, Ethernet, telephony, optical networking, packet networks, wireless mesh networks (WMN), local area networks (LAN), metropolitan area networks (MAN), wide area networks (WAN), hybrid fiber coax (HFC), communication signaling, wireless protocols, communication signaling, peer-to-peer networking over Bluetooth, Bluetooth low energy, Wi-Fi Direct, near field communication (NFC), or some other communication format, including combinations thereof. The communication links could be direct links or may include intermediate networks, systems, or devices.

Computing system 610 may be representative of any computing apparatus, system, or systems on which the visualization processes disclosed herein or variations thereof may be suitably implemented. Computing system 610 provides an example of a computing system that could be used as a either a server or a client device in some implementations, although such devices could have alternative configurations. Examples of computing system 610 include mobile computing devices, such as cell phones, tablet computers, laptop computers, notebook computers, and gaming devices, as well as any other type of mobile computing devices and any combination or variation thereof. Examples of computing system 610 also include desktop computers, server computers, and virtual machines, as well as any other type of computing system, variation, or combination thereof. In some implementations, computing system 610 could comprise a mobile device capable of operating in a server-like fashion which, among other uses, could be utilized in a wireless mesh network.

Computing system 610 includes processing system 601, storage system 603, software 605, communication interface 608, and user interface 609. Processing system 601 is operatively coupled with storage system 603, communication interface 608, and user interface 609. Processing system 601 loads and executes software 605 from storage system 603. Software 605 includes application 606 and operating system 607. Application 606 may include visualization process 200 in some examples. When executed by computing system 610 in general, and processing system 601 in particular, software 605 directs computing system 610 to operate as described herein for visualization process 200 or variations thereof. In this example, user interface 609 includes display system 611, which itself may be part of a touch screen that also accepts user inputs via touches on its surface. Computing system 610 may optionally include additional devices, features, or functionality not discussed here for purposes of brevity.

Referring now to FIG. 7, a block diagram that illustrates computing system 700 in an exemplary implementation is shown. Computing system 700 provides an example of computing system 101, or any computing system that may be used to execute visualization process 200 or variations thereof, although such systems could use alternative configurations. Computing system 700 includes processing system 701, storage system 703, software 705, communication interface 707, and user interface 709. User interface 709 comprises display system 708. Software 705 includes application 706 which itself includes visualization process 200. Visualization process 200 may optionally be implemented separately from application 706.

Computing system 700 may be representative of any computing apparatus, system, or systems on which application 706 and visualization process 200 or variations thereof may be suitably implemented. Examples of computing system 700 include mobile computing devices, such as cell phones, tablet computers, laptop computers, notebook computers, and gaming devices, as well as any other type of mobile computing devices and any combination or variation thereof. Note that the features and functionality of computing system 700 may apply as well to desktop computers, server computers, and virtual machines, as well as any other type of computing system, variation, or combination thereof.

Computing system 700 includes processing system 701, storage system 703, software 705, communication interface 707, and user interface 709. Processing system 701 is operatively coupled with storage system 703, communication interface 707, and user interface 709. Processing system 701 loads and executes software 705 from storage system 703. When executed by computing system 700 in general, and processing system 701 in particular, software 705 directs computing system 700 to operate as described herein for visualization process 200 or variations thereof. Computing system 700 may optionally include additional devices, features, or functionality not discussed herein for purposes of brevity.

Referring still to FIG. 7, processing system 701 may comprise a microprocessor and other circuitry that retrieves and executes software 705 from storage system 703. Processing system 701 may be implemented within a single processing device but may also be distributed across multiple processing devices or sub-systems that cooperate in executing program instructions. Examples of processing system 701 include general purpose central processing units, application specific processors, and logic devices, as well as any other type of processing device, combinations, or variations thereof.

Storage system 703 may comprise any computer readable media or storage media readable by processing system 701 and capable of storing software 705. Storage system 703 may include volatile and nonvolatile, removable and non-removable media implemented in any method or technology for storage of information, such as computer readable instructions, data structures, program modules, or other data. Storage system 703 may be implemented as a single storage device but may also be implemented across multiple storage devices or sub-systems co-located or distributed relative to each other. Storage system 703 may comprise additional elements, such as a controller, capable of communicating with processing system 701. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In no case is the storage media a propagated signal.

In operation, in conjunction with user interface 709, processing system 701 loads and executes portions of software 705, such as visualization process 200, to render a graphical user interface for application 706 for display by display system 708 of user interface 709. Software 705 may be implemented in program instructions and among other functions may, when executed by computing system 700 in general or processing system 701 in particular, direct computing system 700 or processing system 701 to display a user interface for a control program editor comprising programming logic associated with at least one machine system. In addition, software 705 directs computing system 700 or processing system 701 to receive operational data associated with operating the at least one machine system controlled by an industrial controller executing the programming logic. Further, software 705 directs computing system 700 or processing system 701 to process the programming logic and the operational data to determine contextual associations between the programming logic and the operational data. Software 705 also directs computing system 700 or processing system 701 to, in the user interface for the control program editor, display the operational data in context with the programming logic associated therewith based on the contextual associations.

Software 705 may include additional processes, programs, or components, such as operating system software or other application software. Examples of operating systems include Windows®, iOS®, and Android®, as well as any other suitable operating system. Software 705 may also comprise firmware or some other form of machine-readable processing instructions executable by processing system 701.

In general, software 705 may, when loaded into processing system 701 and executed, transform computing system 700 overall from a general-purpose computing system into a special-purpose computing system customized to facilitate programming industrial control systems to operate machinery in an industrial automation environment as described herein for each implementation. For example, encoding software 705 on storage system 703 may transform the physical structure of storage system 703. The specific transformation of the physical structure may depend on various factors in different implementations of this description. Examples of such factors may include, but are not limited to the technology used to implement the storage media of storage system 703 and whether the computer-storage media are characterized as primary or secondary storage.

In some examples, if the computer-storage media are implemented as semiconductor-based memory, software 705 may transform the physical state of the semiconductor memory when the program is encoded therein. For example, software 705 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 700 is generally intended to represent a computing system with which software 705 is deployed and executed in order to implement application 706 and/or visualization process 200 (and variations thereof). However, computing system 700 may also represent any computing system on which software 705 may be staged and from where software 705 may be distributed, transported, downloaded, or otherwise provided to yet another computing system for deployment and execution, or yet additional distribution. For example, computing system 700 could be configured to deploy software 705 over the internet to one or more client computing systems for execution thereon, such as in a cloud-based deployment scenario.

Communication interface 707 may include communication connections and devices that allow for communication between computing system 700 and other computing systems (not shown) or services, over a communication network 711 or collection of networks. In some implementations, communication interface 707 receives dynamic data 721 over communication network 711. Examples of connections and devices that together allow for inter-system communication may include network interface cards, antennas, power amplifiers, RF circuitry, transceivers, and other communication circuitry. The aforementioned network, connections, and devices are well known and need not be discussed at length here.

User interface 709 may include a voice input device, a touch input device for receiving a gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface 709. In this example, user interface 709 includes display system 708, which itself may be part of a touch screen that also accepts user inputs via touches on its surface. The aforementioned user input devices are well known in the art and need not be discussed at length here. User interface 709 may also include associated user interface software executable by processing system 701 in support of the various user input and output devices discussed above. Separately or in conjunction with each other and other hardware and software elements, the user interface software and devices may provide a graphical user interface, a natural user interface, or any other kind of user interface.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The above description and associated drawings teach the best mode of the invention. The following claims specify the scope of the invention. Some aspects of the best mode may not fall within the scope of the invention as specified by the claims. Also, while the preceding discussion describes embodiments employed specifically in conjunction with the monitoring and analysis of industrial processes, other applications, such as the mathematical modeling or monitoring of any man-made or naturally-existing system, may benefit from use of the concepts discussed above. Further, those skilled in the art will appreciate that the features described above can be combined in various ways to form multiple variations of the invention. As a result, the invention is not limited to the specific embodiments described above, but only by the following claims and their equivalents.

What is claimed is:

1. One or more non-transitory computer-readable storage media having program instructions stored thereon to facilitate programming industrial control systems to operate machinery in an industrial automation environment, wherein the program instructions, when executed by a computing system, direct the computing system to at least:
   display a user interface for a control program editor comprising programming logic associated with at least one machine system;
   receive operational data that indicates a status of machinery corresponding to at least a portion of the programming logic;
   generate a graphical representation of the operational data;
   determine, based at least on a position of the programming logic in the user interface, a location for the graphical representation in the user interface proximate to the programming logic; and
   in the user interface, display the graphical representation at the location.

2. The one or more non-transitory computer-readable storage media of claim 1 wherein the operational data comprises visualizations associated with an operation of the at least one machine system.

3. The one or more non-transitory computer-readable storage media of claim 1 wherein the operational data comprises key performance indicators associated with an operation of the at least one machine system.

4. The one or more non-transitory computer-readable storage media of claim 1 wherein the program instructions further direct the computing system to:
   display at least one interaction control in-line with the at least a portion of programming logic; and
   in response to a selection of the at least one interaction control, direct an industrial controller to execute the at least a portion of the programming logic.

5. The one or more non-transitory computer-readable storage media of claim 4 wherein the program instructions further direct the computing system to, in response to the selection of the at least one interaction control, display new operational data resulting from the industrial controller executing the at least a portion of the programming logic.

6. The one or more non-transitory computer-readable storage media of claim 1 wherein the programming logic comprises textual and graphical formats.

7. The one or more non-transitory computer-readable storage media of claim 1 wherein the programming logic comprises relay ladder logic.

8. A method to facilitate programming industrial control systems to operate machinery in an industrial automation environment, the method comprising:
   displaying a user interface for a control program editor comprising programming logic associated with at least one machine system;
   receiving operational data that indicates a status of machinery corresponding to at least a portion of the programming logic;
   generating a graphical representation of the operational data;
   determining, based at least on a position of the programming logic in the user interface, a location of the graphical representation in the user interface proximate to the programming logic; and
   in the user interface, displaying the graphical representation at the location.

9. The method of claim 8 wherein the operational data comprises visualizations associated with an operation of the at least one machine system.

10. The method of claim 8 wherein the operational data comprises key performance indicators associated with an operation of the at least one machine system.

11. The method of claim 8 further comprising:
   displaying at least one interaction control in-line with the at least a portion of programming logic; and
   in response to a selection of the at least one interaction control, directing an industrial controller to execute the at least a portion of the programming logic.

12. The method of claim 11 further comprising, in response to the selection of the at least one interaction control, displaying new operational data resulting from the industrial controller executing the at least a portion of the programming logic.

13. The method of claim 8 wherein the programming logic comprises textual and graphical formats.

14. The method of claim 8 wherein the programming logic comprises relay ladder logic.

15. A computing device to facilitate programming industrial control systems to operate machinery in an industrial automation environment, the computing device comprising:
   one or more non-transitory computer-readable storage media;
   one or more processors operatively coupled with the one or more non-transitory computer-readable storage media; and
   program instructions stored on the one or more non-transitory computer-readable storage media that, when executed by the one or more processors, direct the computing device to at least:
      display a user interface for a control program editor comprising programming logic associated with at least one machine system;
      receive operational data that indicates a status of machinery corresponding to at least a portion of the programming logic;
      generate a graphical representation of the operational data;
      determine, based at least on a position of the programming logic in the user interface, a location of the graphical representation in the user interface proximate to the programming logic; and
      in the user interface, display the graphical representation at the location.

16. The computing device of claim 15 wherein the operational data comprises visualizations associated with an operation of the at least one machine system.

17. The computing device of claim 15 wherein the operational data comprises key performance indicators associated with an operation of the at least one machine system.

18. The computing device of claim 15 wherein the program instructions further direct the computing device to:
   display at least one interaction control in-line with the at least a portion of programming logic; and
   in response to a selection of the at least one interaction control, direct an industrial controller to execute the at least a portion of the programming logic.

19. The computing device of claim 18 wherein the program instructions further direct the computing device to, in response to the selection of the at least one interaction control, display new operational data resulting from the industrial controller executing the at least a portion of the programming logic.

20. The computing device of claim 15 wherein the programming logic comprises textual and graphical formats.

* * * * *